INVENTOR
HAROLD L. BLAKEY
BY
ATTORNEY

May 11, 1948. H. L. BLAKEY 2,441,132
SHIELD FOR TRACTORS
Filed June 19, 1946 3 Sheets-Sheet 2

INVENTOR
HAROLD L. BLAKEY
BY
ATTORNEY

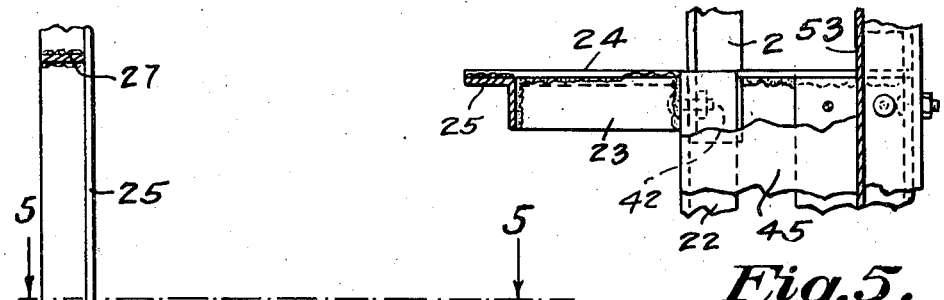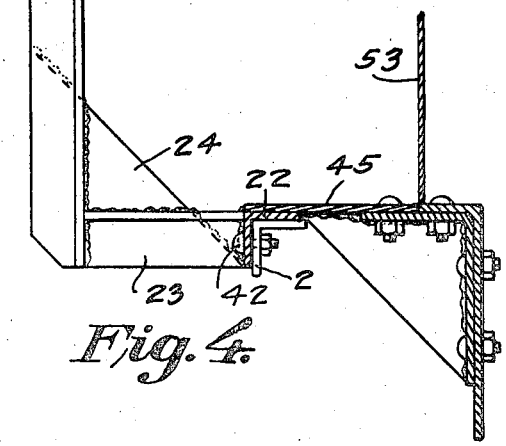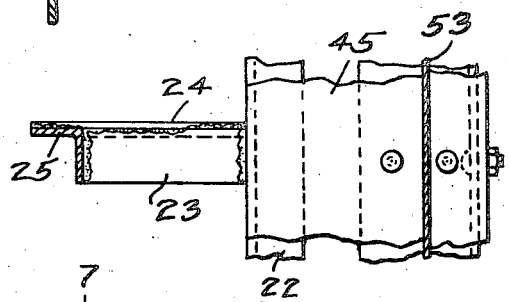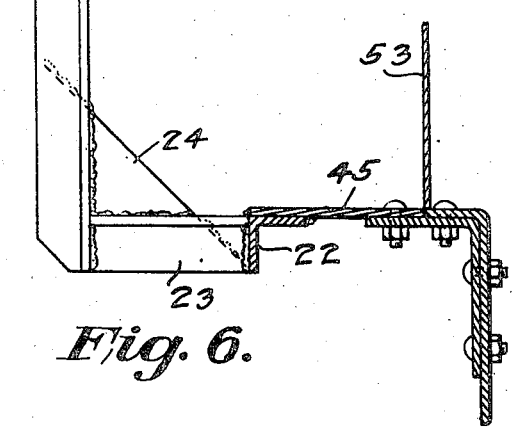

Patented May 11, 1948

2,441,132

UNITED STATES PATENT OFFICE 2,441,132

SHIELD FOR TRACTORS

Harold L. Blakey, Austwell, Tex., assignor to the United States of America as represented by the Secretary of the Interior Application June 19, 1946, Serial No. 677,842

6 Claims. (Cl. 293—54)

(Granted under the act of March 3, 1883, as amended April 30, 1928; 370 O. G. 757)

The invention described herein may be manufactured and used by or for the Government of the United States for governmental purposes without the payment to me of any royalty thereon, in accordance with the provisions of the act of April 30, 1928 (Ch. 460, 45 Stat. L. 467).

This invention relates to a brush shield for a tractor of the type used with a brush cutter in brush-cutting operations.

This invention is particularly useful in clearing areas overgrown with brush, such as live oak, black oak, sweet bay, yaupon and huckleberry, ranging in height from 2 to 20 feet and density up to 250,000 stems per acre. Heretofore such brush has been cut with the use of a conventional industrial type motor-driven tractor with a roller type cutter. The tractor is driven into, through and over the brush in the cutting operation and in advance of the cutter, the latter being pulled by the tractor. In these brush-cutting operations with a tractor and a roller type cutter, both the operator and mechanical parts of the tractor are exposed to direct contact with fallen trees, large overhanging trees, flying sticks from live and dead stems released under strain, large limbs, roots and stumps frequently whipped forward by the cutter, and unavoidable masses of rough brush, dragging along the sides and over the top of the tractor. These continual hazards to life, limb and eyesight present unsafe working conditions for the operator. Exposure of vulnerable tractor parts, such as its radiator, fan, wiring system, oil and fuel lines, exhaust stack and breather stacks and hydraulic hose lines, in like manner provide unsafe operating conditions that may result in costly repairs.

This invention provides a brush shield construction which is adapted to be conveniently mounted on the frame of the tractor of a combination tractor and roller cutter machine. The construction of this invention, when installed on the tractor, protects its operator and also exposed mechanical parts of the tractor from injury and damage which might otherwise be caused by the brush through which the tractor passes in the brush-cutting operations. In a preferred embodiment, the brush shield of this invention has such construction that it provides a barrier to the brush as well as to flying sticks, limbs and the like, maximum visibility for the tractor operator, and clearance for free action of protected and moving mechanical parts of the tractor. A preferred embodiment of this invention is in sectional form to facilitate its fabrication, its assembly on the tractor, and its removal from the tractor, and also is so constructed as to provide adequate rigidity and strength for its intended purpose without the use of interior cross members which would provide obstructions within the space enclosed and protected by the shield.

It is therefore an object of this invention to provide a construction for use as a brush shield on a tractor for use in pulling a roller type brush cutter.

A further object of this invention is to provide the tractor of a brush-cutting machine with a construction which is highly efficient in protecting the operator and exposed mechanical parts of the tractor from injury and damage as the tractor is operated through brush to pull the brush cutter in brush-cutting operations.

Still another object is to provide a tractor type of brush shield which is relatively simple and inexpensive to manufacture, assemble on a tractor, and remove from the tractor.

Another object is to provide a relatively simple and inexpensive tractor type of brush shield which has adequate rigidity and strength for its intended purpose and yet does not require the use of reinforcing means extending through the space enclosed and protected by the brush shield.

Still another object is to provide a tractor type of brush shield which has such external shape as to make it particularly adapted for its purpose in brush-cutting operations in areas where the brush is both tall and thick.

Other objects and advantages of this invention will be apparent from the following description, the appended claims and the accompanying drawings, wherein Fig. 1 is a side elevational view of a tractor provided with a brush shield embodying this invention, the tractor being of the type for towing a roller type cutter through brush to be cut.

Fig. 4 is an enlarged detail view taken on line 4—4 of Fig. 1.

Fig. 5 is a detail plan view on line 5—5 of Fig. 4.

Fig. 6 is an enlarged detail view on line 6—6 of Fig. 1.

Fig. 7 is a detail plan view on line 7—7 of Fig. 6.

Figure 1:
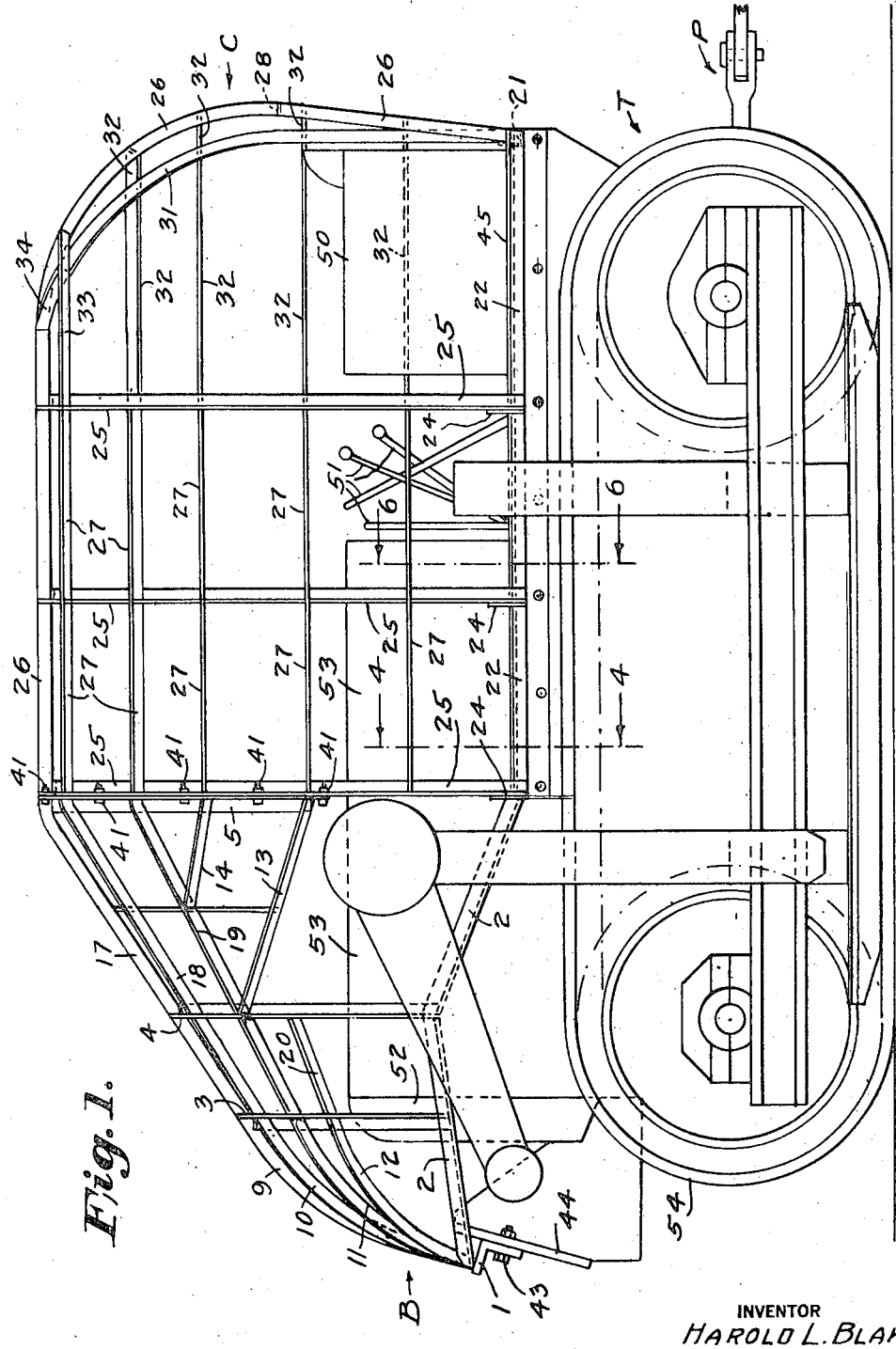

The brush shield of this invention, as illustrated in the accompanying drawings, comprises three sections: The right front section A of Fig. 2, the left front section B of Figs. 1 and 2, and the cab section C of Figs. 1 and 3. Each of these three sections consists of a plurality of members which are assembled into the form of a section as illustrated in the drawings and which are secured together, as by welding, wherever they meet, cross or intersect each other. This multiple interconnection of the structural members in each section contributes to its rigidity and strength.

Shield section A

The right front section A of the brush shield comprises a front frame member 1, a side frame member 2, a plurality of riser members 3, 4 and 5, a plurality of forward radiator cover riders 7, 8, 9, 10, 11 and 12, side framing riders 13 and 14, a plurality of motor cover riders 15, 16, 17, 18, 19 and 20, and a brace member 6. The frame members 1 and 2 and the riser members 3, 4 and 5 are preferably formed of angle iron.

Figure 2:
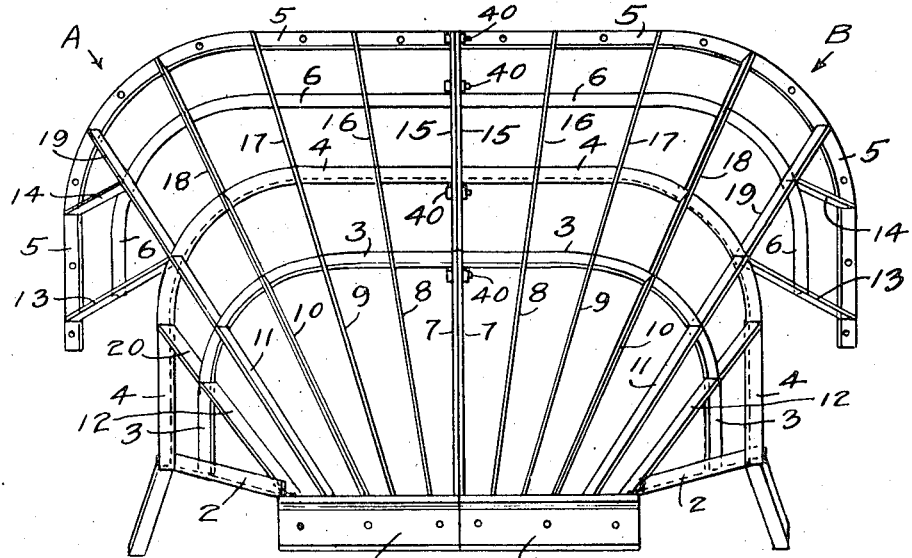
Fig. 2 is a front elevational view of the forward part of the brush shield of Fig. 1.

The front frame member 1 has a forwardly extending flange, to which the riser members 7 through 12 are secured in spaced relation, and a downwardly extending flange (see Figs. 1 and 2).

The side frame member 2 has a vertically upstanding flange, at the base of which is an inwardly extending flange. The forward end of the member 2 is secured to the outer end of the front frame member 1, and its rearward end is secured to the cab section C. The riser members 3 and 4 extend to and are secured to the flanges of the frame member 2.

Each of the riser members 3, 4 and 5 has a flange arranged in a substantially vertical plane, at the inner edge of which is the second flange (see Figs. 1 and 2). The second flange of each of the members 3 and 5 extends forwardly; the second flange of member 4 extends rearwardly.

The inner ends of the frame member 1 and the riser member 5 are connected by the rider members 7 and 15 arranged in end to end relation. The riser member 3 is curved as illustrated, for example, in Fig. 2 and has its opposite ends connected, respectively, to the side frame member 2 and the meeting ends of the riders 7 and 15. The radiator cover riders 7 through 12 are preferably flat bars curved edgewise and extend from the front frame member 1 to the first and shorter riser member 3. The vertically extending flange of the riser member 3 abuts the upper ends of the riders 7 through 12 and also the lower ends of the riders 15 through 19. The riser member 3 has its forwardly extending flange suitably notched to receive and fit the intersecting portions of the upper ends of the forward or radiator cover riders 8, 9, 10, 11 and 12. A butt joint is formed between the upper or inner end of the front riser member 3 and the upper end of the radiator cover rider 7.

The outermost motor cover rider 20 is a relatively short, flat bar extending between and abutting the up-standing flanges of the riser members 3 and 4. The motor cover riders 15 through 19 extend from the foremost riser member 3 to the rearward riser member 5 and form butt joints with their up-standing flanges.

The intermediate riser member 4 has its vertically extending flange intersected by the motor cover riders 16, 17, 18 and 19, the vertical flange of the riser member 4 being suitably notched for such purpose. The upper or inner end of the riser member 4 abuts and is secured to the motor cover rider 15. The other or lower end of the riser member 4 extends along the outer face of the up-standing flange of the side frame member 2 and is secured thereto. The side framing riders 13 and 14 extend in substantially parallel relation to each other and between the rider 19 and the rearwardmost riser member 5. The rearward ends of the riders 13 through 19 may be bent edgewise to pass over the forwardly extending flange of the riser member 5, or the latter flange of the riser member 5 may be notched to receive the rearward ends of the rider members 13 through 19. The ends of the rider members 13 through 19 abut and are secured to the vertical flange of the riser member 5.

Reinforcement for the riders 13 through 19 is provided by a brace or strap 6 shaped to lie flat against the inner edges of the engaged rider members. This brace 6 is secured at one end to the rider 13, passes under the rider 19 at its connection with the rider 14, passes under each of the riders 16, 17 and 18, and is secured at its other end to the rider 15.

Shield sections A and B

The right and left forward sections A and B of the brush shield are similarly formed, and duplication of parts in these two sections is shown by use of the same reference numerals in the drawings illustrating these two sections. The two sections A and B are assembled by placing the riders 7 and 15 of one section in abutting relation with the riders 7 and 15 of the other section. The two radiator cover riders 7 are secured together in abutting relation in suitable manner. They may be secured together by means of lock bolts 40 and supplemented by spot welding which may be readily broken by a suitable tool when the two sections are to be separated. The two motor cover riders 15 may be secured together in the same way as the two radiator cover riders 7.

In their assembled relation, the two forward brush shield sections A and B present essentially a plurality of riders extending from the front frame members 1, where they are closely spaced, to the rearwardmost riser member 5, where they are more widely spaced. These riders also extend upwardly from the front frame members 1 and then curve over the tractor radiator. Between the two riser members 3 and 5, the riders present a substantially inclined and transversely rounded brush shield portion.

It will be noted that the riders 7 through 20 of the front sections A and B are so arranged that they each present an edge for engagement with brush through which the tractor is being driven. This positioning of the riders 13 through 20 facilitates passage of the shield through thick, tall brush.

Cab section C

The cab section C comprises a rearward frame or cross member 21 (see Fig. 3), and two similar side frame members 22 (see Figs. 4 and 6) which are secured together in end to end relation. The three frame members 21 and 22 are formed of angle iron and are each arranged to provide an up-standing flange and a horizontal flange. The horizontal flange of the frame member 21 extends rearwardly from the vertical flange. The horizontal flanges of the side frame members 22 extend inwardly or toward each other.

The cab section C also comprises three cab riser members 25 arranged in spaced and substantially parallel relation. Each of these three cab riser members is formed of angle iron and is formed lengthwise in a substantially U-shape. Each of the three cab riser members 25 has a vertical flange and an inner rearwardly extending flange. Each end of a cab riser member 25 is secured (see Figs. 4 through 7), to the adjacent cab side frame member 22 by a frame extension member 23 of angle iron and a triangle brace plate 24, these parts being held in assembled relation as by welding.

Figure 3:
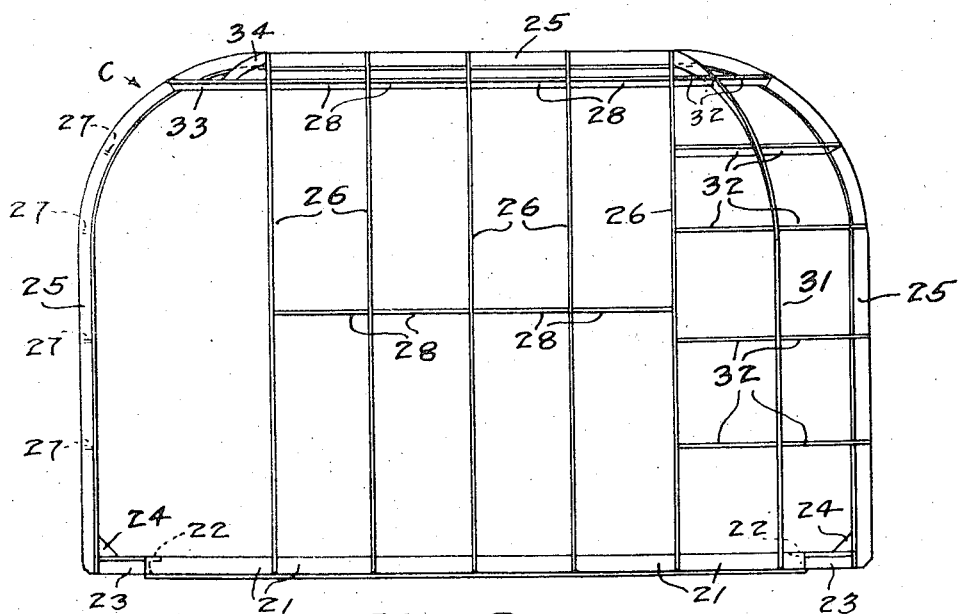
Fig. 3 is a rear elevational view of the cab section part of the brush shield of Fig. 1.

The cab section C is also provided with a plurality of cab top and back riders 26 (five are shown in the drawing), each of which extends from the up-standing flange of the forwardmost cab riser member 25 through notches in the up-standing flanges of the other two cab riser members 25 (see Fig. 1) and to the rearwardly extending flange of the cab section rear frame member 21 (see Fig. 3). Each of the cab top and back riders 26 has its opposite ends secured in abutting relation to the engaged flanges of the foremost cab riser member 25 and the cab frame member 21. The up-standing flanges of the rearward two cab riser members 25 are suitably notched to receive the cab top and back riders 26. These riders 26 are substantially straight along that part of their length extending between the three cab riser members 25. The cab top and back riders 26 may be formed of flat bars which are shaped edgewise (see Fig. 1) to curve downwardly from the rearmost cab riser member 25 and then inwardly to the cab rear frame member 21.

Each side of the cam section C is provided with a plurality of cab side riders 27 arranged in spaced, parallel relation (see Fig. 1). Each of these cab side riders 27 extends from the outwardly extending flange of the forward cab riser member 25 through a suitably shaped notch in the intermediate cab riser member 25 and to the outwardly extending flange of the rearmost cab riser member 25.

Each two adjacent cab top and back riders 26 are secured together in spaced relation by a set of two cab back spacers 28.

The rearward right corner of the cab section is completed by a vertical rider 31 (see Figs. 1 and 3) and a plurality of lateral riders 32. The vertical rider 31 is preferably a flat bar curved edgewise to conform to the general shape of the cab and to extend from the rearward flange of the frame member 21 to the rearmost cab riser member 25. Certain of the lateral riders 32 serve to space and to secure together the back vertical rider 31 and the adjacent cab top and back rider 26. The other lateral riders 32 serve to space apart and to secure together the vertical rider 31 and the adjacent side of the rearmost cab riser member 25. The spacers 32 are curver edgewise to provide a rounded shape for their portion of the cab section C.

The cab section C is entered through an opening at its rearward left side. This opening is formed between the rearmost riser member 25 and the nearest cab top and back rider 26. The lower limit of this opening is formed by the left side frame member 22, and extension member 23, and the rear frame member 21. The upper limit of this opening is formed by a lateral rider 33. This rider 33 is curved edgewise and extends between the vertical flange of the rearmost riser member 25 and the nearest rider 26. A curved vertical rider 34 extends from the center of the lateral rider 33 and to the joint connecting the rear riser 25 and the nearest rider 26.

Tractor and cutter machine

The brush shield of Figs. 2 through 7 is intended to be assembled and mounted on a tractor T as illustrated in Fig. 1. The tractor T is of conventional form and is connected by a drawpin P to a roller type of cutter (not shown) also of conventional construction. The tractor T includes a set of tracks 54 (one shown in Fig. 1), a seat 50, a control mechanism 51, a radiator 52, and an engine cover 53. The engine and mechanical operating parts of the tractor which are mounted on the chassis frame extend between the radiator 52 and the control mechanism 51. The engine and mechanical operating parts of the tractor T therefore extend into the space protected by the forward brush shield sections A and B and into the forward part of the interior of the cab section C. Thus, the conventional parts of a tractor, such as the engine, breather stack, pipe lines and manually operated parts, are protected by the brush shield.

Shield assembly and mounting

The three sections A, B and C of the brush shield may be assembled before or during installation on the tractor T. The assembly of the front sections A and B has been heretofore described and is accomplished by bolting and spot welding together the rider members 7 and 7 and the rider members 15 and 15 in face to face relation. The two front sections A and B are secured to the cab section C by means of bolts 41 and spot welding in the same manner as section A is secured to section B. In assembling the sections A and B to section C, the outwardly extending flanges of the angle irons or risers 5 are secured in face to face relation to the outwardly extending flange of the forward riser member 25 of the cab section C. Assembly of the combined front sections A and B with the cab section C is completed by securing the rear ends of the front section frame members 2 to the forward ends of the cab section side frame members 22 (see Fig. 4) by means such as a bolt and nut 42. In the assembled relation of the sections A, B, and C, the two risers 5 and the cab forward riser 25 provide in effect a single, composite riser.

The three brush shield sections A, B and C may be mounted on and secured to the chassis or frame of the tractor T in any suitable manner. The front section frame members 1 may be secured with lock bolts 43 to the tractor plate 44 (see Fig. 1). The side frame members 22 of the brush shield cab section C may be secured to side members of the tractor chassis frame by means of plates or brackets 45 (Figs. 4 and 6) which may be welded in place. The brush shield may also, in addition, be supported by a plate or bracket (not shown) secured, as by welding, to both the rear member of the tractor chassis frame and the rear frame member 21 of the cab section C.

An important characteristic of the brush shield of this invention is its structural shape. It is to be noted that all exterior corners and obstructions are eliminated by rounding or curving edgewise the shield rider members or bars at all intersecting planes.

The forward ends of the brush shield sections A and B, that is, the portions in front of and over the radiator 52, present a curving contour from front to back and side to side. This curving contour at the top outside borders of the sections B and C continues from the vertical plane of the radiator 52 to the risers 5. In their installed positions, the shield sections A and B extend from a position in front of the conventional tractor hydraulic pump protector plate 44 and below the level of any portion of the radiator 82 exposed to the brush in the forward motion of the tractor T. The forward sections A and B rise to radiator height in a rearward curve, this curve continuing upwardly and rearwardly over the radiator 82 to provide clearance for access to the radiator filler cap. From the plane of the radiator 82 the sections A and B expand regularly until they meet and conform to the forward end of the cab section C. The top outside borders of the cab section C continue the curved shape of the rearward end of the assembled shield sections A and B.

Each of the rider members of the complete brush shield is so arranged in place that it presents a fender edge to the brush through which the tractor and shield is passing.

The relative spacing of the rider members is such as to provide adequate protection for the tractor operator and the tractor operating parts and at the same time to provide maximum visibility in all directions for the operator. The spacing of the riders 7 through 12 in each of the front shield sections A and B is preferably about 3 inches where these rider members are secured to the front frame members 1. The spacing (see Fig. 2) of the rider members 7 through 12 and 15 through 20 gradually increases to the riser members 5, where the rider spacing is preferably about a foot. This rider spacing of about a foot is also preferred for the remaining riders of the brush shield, except as otherwise indicated.

The shape of the assembled front sections A and B may be characterized generally as a frustrum of a semi-cone having a somewhat rounded and forwardly converging nose. The shape of the assembled front sections A and B may also be characterized as tapering and converging in a downwardly, inwardly and forwardly extending direction. The cab section C continues the shape of the front sections A and B and comprises a top, sides and a back with rounded corners provided at their planes of intersection.

The brush shield of this invention, and as illustrated in the accompanying drawings, provides adequate protection for the operator and the tractor from contact with the brush through which the tractor T passes in pulling a roller type cutter (not shown). The brush shield provides no obstruction to normal operation, maintenance, adjustment, refueling and repair of the machine. Normal maintenance and repair of the machine may be accomplished without removal of the shield or any section thereof from the machine. Major repair operations on the motor of the tractor T may be accomplished by temporary removal of one or both of the front sections A and B.

The operator and tractor parts that are exposed above the level of the tractor frame are protected in all directions from contact with the brush. The shape of the forward sections A and B of the brush shield, the width of the cab section C and the spacing of both the riser members and the rider members are such as to deflect the brush to positions well above and to the sides of the tractor and at the same time to eliminate the hazard of flying sticks. The operator in seated position is removed by more than an arm's length in all directions from the brush through which the tractor is passing.

The open work construction of the brush shield provides practically unobstructed full vision for the tractor operator. Maximum visibility is accomplished by widely spacing the riser members and also by providing them with positions of least conflict with the vision of the operator. Maximum visibility is also secured by positioning the rider members edgewise in all directions from the operator's perspective point of view. The clearance between the back of the operator's seat 50 and the riders 26 affords the operator full view of the draw-bar pin P from sitting position, thereby facilitating the making and breaking of hookups with the cutter (not shown). The spacing of the riser members and the spacing of the rider members are such as to provide a full range of free action for all moving tractor parts without exposing any part of the interior of the shield to entrance of the brush. The spacing of the riser members and the spacing of the rider members also provide unobstructed openings which facilitate normal adjustments of the tractor from a ground position, such adjustments including the oiling and servicing of the radiator, fan, and ignition and carbureter systems.

Rigidity and added strength to withstand contact with heavy timbers, without the use of interior cross braces, are secured by the use of the angle iron riser members and the edgewise positioning of the rider members, with all parts of the shield secured at each point of contact to provide interbracing.

The brush shield also provides an entrance opening for the operator without exposing the interior of the shield to brush in the brush-cutting operations. The cab section C is of such height that the operator may maintain a standing position therein and throughout the cab section for normal function in controlling and operating the tractor T.

Adequate clearance is provided by the shield sections A and B so that without their removal from the tractor, the motor hood 53 may be raised or removed and motor repairs and adjustments may be made within the shield. Major repairs of the tractor engine may be accomplished by removing one or both of the sections A and B. This removal is made by removing the corresponding bolts 40, 41, 42 and 43 and breaking the corresponding spot welds.

The shield has other valuable advantages. The rider members of the shield may serve as a ladder and thereby facilitate the safe climbing of the operator up the side of the shield. The platform-like top of the shield, and particularly the top part of the cab section C, may be used as a platform or elevated viewing stand for surveying and planning the progress of cutting in closed stands.

Complete freedom of mind from thoughts of physical injury, afforded by positive protection of the operator, reduces his training time in breaking in as a new operator, and thus greatly increases the efficiency of a brush-cutting project.

The foregoing is understood to be illustrative, since this invention includes all modifications and embodiments coming within the scope of the appended claims.

I claim:

1. A brush shield for the tractor of a motor driven, occupant controlled tractor and brush cutter machine, said brush shield comprising a base frame adapted to substantially encircle the superstructure of the tractor and to be secured to and supported by the tractor chassis, a plurality of riser members secured to and supported by the opposite sides of said base frame in spaced relation longitudinally of said frame, and a plurality of rider members interconnecting said riser members to present multiple spaced fender edges extending from the front of said frame upwardly, and over and along the opposite sides of the tractor superstructure and downwardly at the rear of the tractor chassis to the rear of said frame, the forward riser and rider members and the forward part of said frame being so formed and related as to provide the forward part of the shield with a forwardly converging and transversely rounded shape, the rearward riser and rider members and the rearward part of said frame being so formed and related as to provide a generally parallelepiped shape having rounded corners at the intersections of the planes of the shield top, the shield sides, and the shield back.

2. A brush shield for the tractor of a motor driven, occupant controlled tractor and brush cutter machine, said brush shield comprising a base frame adapted to substantially encircle the superstructure of the tractor and to be secured to and supported by the tractor chassis, a plurality of angle riser members secured to and supported by the opposite sides of said base frame, said riser members being assembled and mounted on said frame to provide a series of generally U-shaped rider supports spaced longitudinally of said frame, the forward rider supports progressively increasing in overall height and overall width toward the rear of said frame, the remainder of the rider supports being all of substantially the same overall height and overall width, and a plurality of bar rider members interconnecting said rider supports and intersecting flanges of at least some of said angle riser members to present outwardly facing multiple brush fender edges extending from the front of said frame upwardly, and over and along the opposite sides of the tractor superstructure and downwardly at the rear of the tractor chassis to the rear of said frame, the rider members interconnecting said forward rider supports having relatively close spacing at the front of said frame and progressively increased spacing to the largest of said forward rider supports, the relative spacing of the remainder of the rider members being approximately that of the widest spacing of said rider members interconnecting said forward rider supports.

3. A brush shield as defined in claim 2, wherein the base frame is composed of angle members, and the rear of the shield is formed of laterally spaced bar rider members curved edgewise from the rearmost rider support to the rear angle member of said frame.

4. A brush shield as defined in claim 2, wherein an entrance opening for the tractor operator is provided at a rear corner of the shield and by the spacing between the rearmost rider support and the nearest bar rider member at the rear of the shield.

5. A brush shield as defined in claim 2, wherein the shield comprises a plurality of individually separable sections assembled with section edge forming riders in abutting relation and section edge forming rider supports in abutting relation, each section including the corresponding part of the shield base frame.

6. A brush shield for the tractor of a motor driven, occupant controlled tractor and brush cutter machine, said brush shield comprising: a plurality of sections adapted to be assembled and separably secured together on the tractor chassis to protect the tractor superstructure and the tractor operator while providing maximum visibility to the tractor operator; each of said sections including interconnected shield base frame angle members, riser angle members and rider bar members; two of said sections in their assembled relation providing the forward part of the shield and meeting along a line substantially in the vertical plane of the longitudinally extending frame axis, a third section being adapted to be assembled with said two sections by interconnection of abutting riser members; said section riser members with the said sections in assembled relation providing a series of generally U-shaped rider supports spaced longitudinally of said frame; and said riser members with said sections in assembled relation presenting spaced, outwardly facing multiple brush fender edges at the front, top, sides and rear of the shield.

HAROLD L. BLAKEY.

REFERENCES CITED

The following references are of record in the file of this patent:

UNITED STATES PATENTS

| Number | Name | Date |
|---|---|---|
| 2,246,616 | Cherry | June 24, 1941 |
| 2,263,978 | Branovic | Nov. 25, 1941 |
| 2,315,800 | Rochester | Apr. 6, 1943 |
| 2,396,652 | Heilman | Mar. 19, 1946 |